United States Patent
Wu et al.

(10) Patent No.: US 8,593,767 B2
(45) Date of Patent: Nov. 26, 2013

(54) POWER SUPPLY AND THE CONTROL METHOD FOR CONTROLLING THE SAME AND POWER SUPPLY SYSTEM INCORPORATING SUCH POWER SUPPLIES

(75) Inventors: Hongyang Wu, Shanghai (CN); Xiaoni Xin, Shanghai (CN); Bin Wang, Shanghai (CN); Qikun Wu, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 453 days.

(21) Appl. No.: 12/916,824

(22) Filed: Nov. 1, 2010

(65) Prior Publication Data

US 2011/0102951 A1      May 5, 2011

Related U.S. Application Data

(60) Provisional application No. 61/256,635, filed on Oct. 30, 2009.

(51) Int. Cl.
*H02H 7/00*    (2006.01)
(52) U.S. Cl.
USPC ............................................................ 361/18
(58) Field of Classification Search
None
See application file for complete search history.

(56) References Cited

U.S. PATENT DOCUMENTS

| 7,358,375 B2 * | 4/2008 | Jung et al. ....................... 549/65 |
| 2011/0107122 A1 * | 5/2011 | Wang et al. .................... 713/300 |

* cited by examiner

*Primary Examiner* — Rexford Barnie
*Assistant Examiner* — Angela Brooks
(74) *Attorney, Agent, or Firm* — Kirton McConkie; Evan R. Witt (57) ABSTRACT

Disclosed is a power supply and a power supply system using such power supply. The inventive power supply includes a power converter for converting an input voltage into an intermediate output voltage, an output protection circuit connected to an output terminal of the power converter and an output terminal of the power supply for protecting the power converter by its ON/OFF operations, and a control unit connected to the output protection circuit for controlling the output protection circuit. When an operating frequency of the power converter is higher than a first reference frequency and the intermediate output voltage is higher than a first reference voltage, the control unit outputs a first control signal to a control terminal of the output protection circuit to turn off the output protection circuit.

21 Claims, 8 Drawing Sheets

POWER SUPPLY AND THE CONTROL METHOD FOR CONTROLLING THE SAME AND POWER SUPPLY SYSTEM INCORPORATING SUCH POWER SUPPLIES

CROSS-REFERENCE TO RELATED APPLICATION

This application claims the benefit of U.S. Provisional Application No. 61/256,635, filed on Oct. 30, 2009, and entitled "REVERSE CURRENT PROTECTION METHOD", the entirety of which is hereby incorporated by reference.

FIELD OF THE INVENTION

The present invention is related to a power supply and the control method for controlling the same and a power supply system incorporating such power supplies, and more particularly to a power supply with high reliability and adapted for use in a redundant power supply system as well as the control method for controlling such power supply supplies, in which the redundant power supply system employs a plurality of such power supplies connected in parallel in order to supply power.

MOTIVE OF THE INVENTION

With the advancement of technology, electronic devices with versatile functionalities haven been developed. The electronic devices with versatility have been catered to people to fulfill their desires. Nowadays the electronic devices have gradually become a basic appliance to enrich people's lives.

As a result, the commercially available power source, for example, the utility power source, is not ubiquitously applicable to power the electronic devices. In order to supply suitable voltage to ensure the normal operation of the electronic devices, a power converter is required to convert an AC power such as a utility power into a voltage tailored to power the electronic devices. With the increase of the power consumption of electronic devices and the diversity of the applications for electronic devices, a redundant power supply system is provided to increase the reliability of power supply and meet the operating requirement of fault tolerance. The redundant power supply system is built by connecting a plurality of power supplies in parallel and thereby supplying power to electronic devices. The configuration of the redundant power supply system is able to prevent the interruption of power supplying to electronic devices as a result of a faulty power supply or a malfunctioned power supply, thereby ensuring the uninterrupted operation of the electronic devices.

Figure 1:
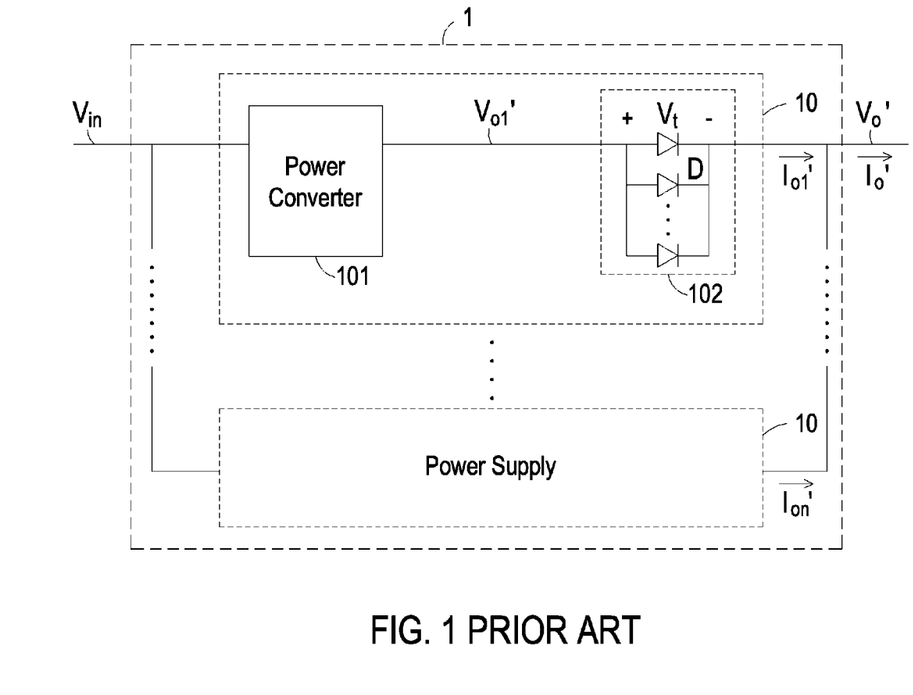
FIG. 1 is a schematic diagram showing a power supply system according to the prior art.

FIG. 1 is a schematic diagram showing a redundant power supply system according to the prior art. As shown in FIG. 1, the redundant power supply system 1 includes a plurality of power supplies 10, by way of example, each of which may have the same or different configuration with one another but the rated output voltage levels are the same. The redundant power supply system 1 is made up by connecting the power output terminal of the power supplies 10 in parallel. In operation, each power supply 10 is configured to convert an input voltage Vin into an output voltage Vo' required to power the electronic device (not shown). The voltage level of the output voltage Vo' may be, for example, 12V. Each power supply 10 contributes a fraction of the systematic output current Io' supplied to the electronic device. That is, the systematic output current Io' is the sum of the output currents Io1'-Ion' of all of the power supplies 10.

As shown in FIG. 1, each power supply 10 includes a power converter 101 and an output protection circuit 102. The power supply 10 is configured to convert an input voltage Vin into an intermediate output voltage Vo1' by the switching operation of an internal switching circuit. The energy of the intermediate output voltage Vo1' is applied to an electronic device (not shown) through the output protection circuit 102. In this example, the output protection circuit 102 is made up of a plurality of Oring-diodes D. Each diode D is connected between an output terminal of the power converter 101 and an output terminal of the power supply 10 for limiting the flowing direction of the output current Io1' flowing through the output protection circuit 102. The diode D functions as an Oring diode for protecting the internal circuit elements in a power supply. When one of the power supplies 10 is malfunctioned e.g. short-circuited, the diode D of the output protection circuit 102 can prohibit a reverse current from being induced in the power supply 10. That is, the diode D can prohibit the output current Io1' from flowing back to the power supply 10. The output protection circuit 102 made up of diodes D can efficiently prohibit the reverse current from being induced. However, diode D is well known to have a forward voltage drop Vt, for example, 0.7V, and the conduction loss of the diode D is significant. Hence, the power efficiency of the power supply 10 is low and thus the overall efficiency of the redundant power supply system 1 is low.

Figure 2:
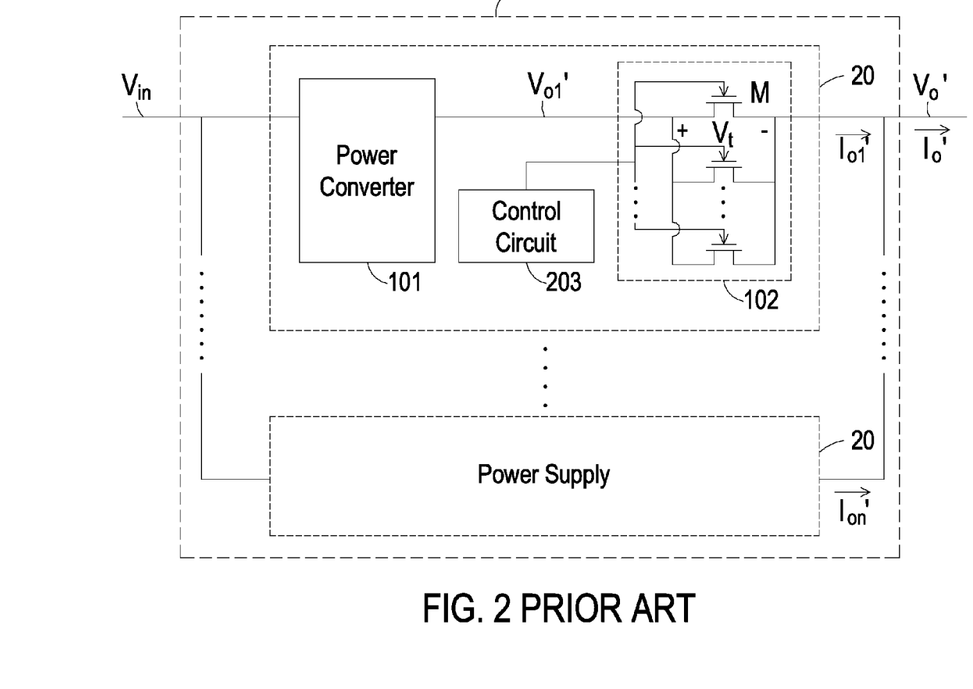
FIG. 2 is a schematic diagram showing another kind of power supply system according to the prior art.

FIG. 2 is a schematic diagram showing another kind of redundant power supply system according to the prior art. Referring to FIGS. 1 and 2, the power supply 20 of the redundant power supply system 2 of FIG. 2 employs a plurality of power transistors M as Oring switches to replace the Oring diodes D of FIG. 1, thereby constituting the output protection circuit 102. As is well known in the art, power transistors M is featured in terms of low conducting impedance and low forward voltage drop, using power transistors M to constitute the output protection circuit 102 can reduce the power loss of the power supply 20 and the redundant power supply system 2, and increase the overall power efficiency. In this example, the control circuit 203 controls the power transistors M to turn on or off according to the voltage difference between the output voltage Vo' and the intermediate output voltage Vo1', i.e. the forward voltage drop Vt. When a reverse current comes into being in the power supply 20, the control circuit 203 can detect the reverse current in the power supply 20 according to the voltage level of the forward voltage drop, and thereby turning off the power transistors accordingly.

Please refer to FIG. 2. In this example, the power converter 101 of the power supply 20 is a resonant power converter. When one of the power supplies 20 is malfunctioned and thereby causing the voltage level of the output voltage Vo' to rise above the rated output voltage having a voltage level of, e.g. 12V. The intermediate output voltage Vo1' of the normally-operating power supplies 20 rises up accordingly since the Oring-switches of the normally-operating power supplies are turned on. Under this condition, the normally-operating power supplies are set to be regulated to maintain the voltage level of the intermediate output voltage Vo1' or the output voltage Vo' to their rated voltage level respectively. By way of example, one of the normally-operating power supplies is a resonant converter and its normal operating range has the characteristic that the DC gain decreases with the increase of the operating frequency. Thus the operating frequency of the power converter 101 of the normally-operating power supply 20 will increase, which in turn causes the power converter 101 of the normally-operating power supply 20 to burn down.

Therefore, it is urgently needed to develop a power supply and a power supply system using such power supply to solve the aforesaid problems. The invention can satisfy these needs.

SUMMARY OF THE INVENTION

An object of the invention is to provide a power supply and the control method for controlling the same and a power supply system incorporating such power supplies for prohibiting a reverse current from being induced as a result of a malfunctioned power supply in the power supply system or from being burnt down due to excessively high operating frequency. Thus, the inventive power supply has higher power efficiency, lower power loss, and lower operating temperature.

To this end, a broad aspect of the invention is associated with a power supply for receiving an input voltage and generating an output voltage, in which the power supply includes a power converter for converting the input voltage into an intermediate output voltage, an output protection circuit connected between an output terminal of the power converter and an output terminal of the power supply for protecting the power supply by its on/off operations, and a control unit connected to the output protection circuit for controlling the output protection circuit. When the operating frequency of the power converter is higher than a reference frequency and the intermediate output voltage is higher than a reference voltage, the control circuit issues a first control signal to a control terminal of the output protection circuit to turn off the output protection circuit.

Another broad aspect of the invention is associated with a power supply system for receiving an input voltage and generating an output voltage and an output current, in which the power supply system includes a plurality of power supplies connected in parallel with each other and at least one of the power supplies includes a power converter for converting the input voltage into an intermediate output voltage, an output protection circuit connected between an output terminal of the power converter and an output terminal of the power supply for protecting the power supply by its on/off operations, and a control unit connected to the output protection circuit for controlling the output protection circuit. When the operating frequency of the power converter is higher than a reference frequency and the intermediate output voltage is higher than a reference voltage, the control circuit issues a first control signal to a control terminal of the output protection circuit to turn off the output protection circuit.

Another aspect of the invention is associated with a control method for controlling a power supply, including the steps of: providing a power converter for converting an input voltage into an intermediate output voltage; providing an output protection circuit connected between an output terminal of the power converter and an output terminal of the power supply for protecting the power supply by its on/off operations; detecting the intermediate output voltage; detecting an operating frequency of the power converter; comparing the intermediate output voltage with a first reference voltage; comparing the operating frequency of the power converter with a first reference frequency; and controlling the output protection circuit to turn off when the intermediate output voltage is higher than the first reference voltage and the operating frequency of the power converter is higher than the first reference frequency.

Now the foregoing and other features and advantages of the present invention will be best understood through the following descriptions with reference to the accompanying drawings, wherein:

DETAILED DESCRIPTION OF THE PREFERRED EMBODIMENT

An exemplary embodiment embodying the features and advantages of the present invention will be expounded in following paragraphs of descriptions. It is to be realized that the present invention is allowed to have various modification in different respects, all of which are without departing from the scope of the present invention, and the description herein and the drawings are intended to be taken as illustrative in nature, and are not intended to be taken as a confinement for the invention.

Figure 3A:
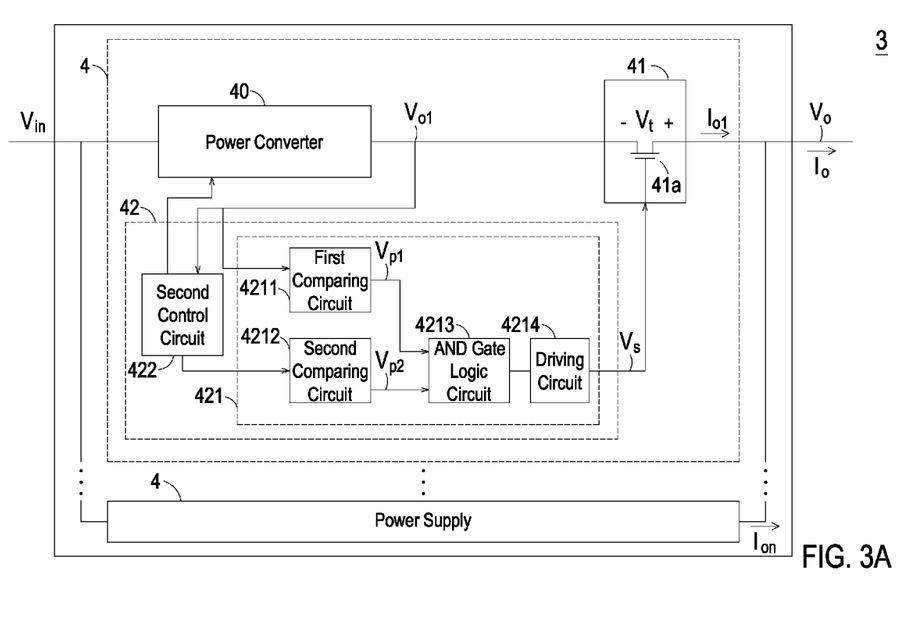
FIG. 3(A) is a circuit block diagram showing a power supply system according to a preferred embodiment of the invention.
Figure 3B:
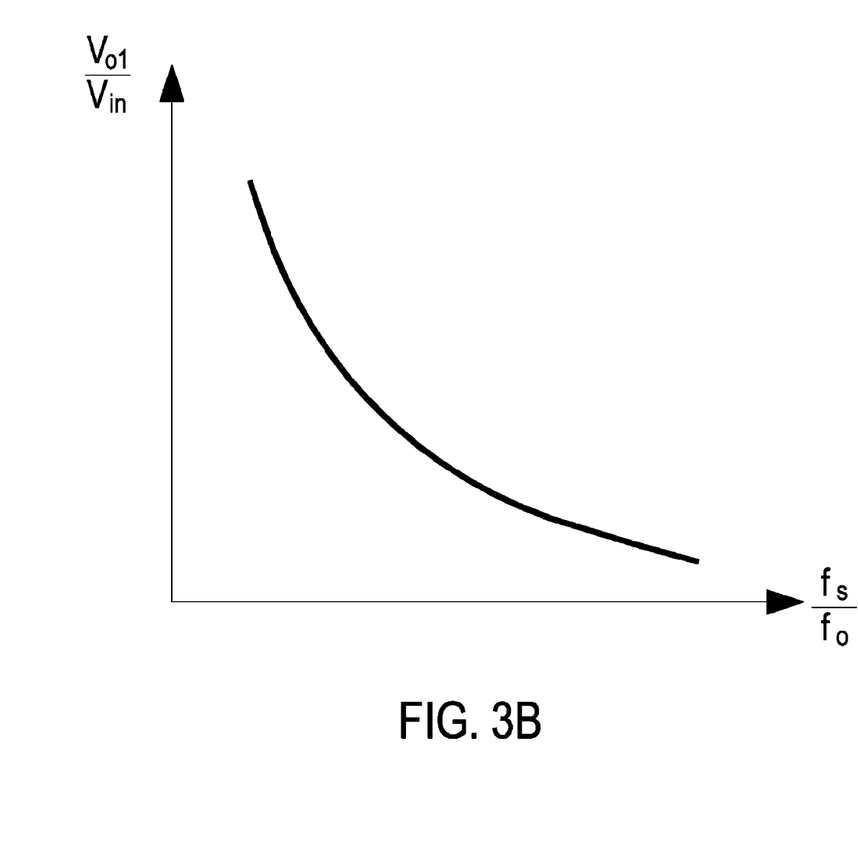
FIG. 3(B) shows the relationship between the DC gain and the operating frequency of the power converter.

Referring to FIGS. 3(A) and 3(B), in which FIG. 3(A) is a circuit block diagram showing a power supply system according to a preferred embodiment of the invention and FIG. 3(B) shows the relationship between the DC gain and the operating frequency of the power converter according to a preferred embodiment of the invention. As shown in FIG. 3(A), the power supply system 3 include a plurality of parallel-connected power supplies 4 for supplying an output voltage Vo to a load (not shown), thereby constituting a redundant power supply system. In operation, each power supply 4 is configured to convert an input voltage Vin into an output voltage Vo tailored to power the load. The voltage level of the output voltage Vo may be, for example, 12V. Each or at least one of the power supplies 4 includes a power converter 40 for converting the input the input voltage Vin into an intermediate output voltage Vo1. The voltage level of the intermediate output voltage Vo1 is slightly higher than Vo, e.g. 12.1V. Each power supply 4 contributes a fraction of the systematic output current Io. That is, the systematic output current Io is the sum of the output currents Io1-Ion of all of the power supplies 4.

Each or at least one of power supply 4 includes a power converter 40, an output protection circuit 41, and a control unit 42. The input terminal of the power converter 40 is connected to the input terminal of the power supply 4. The input voltage Vin is converted into an intermediate output voltage Vo1 by the operation of an internal switching circuit (not shown) in the power converter 4. The energy of the intermediate output voltage Vo1 is delivered to the load (not shown) through the output protection circuit 41. The output protection circuit 41 is connected between the output terminal of the power converter 4 and the output terminal of the power supply 4. In the embodiment, the output protection circuit 41 includes at least one switch 41a connected between the output terminal of the power converter 4 and the output terminal of the power supply 4. However, the output protection circuit 41 may include two or more switches 41a connected in parallel between the output terminal of the power converter 4 and the output terminal of the power supply 4.

The control unit 42 is connected to the power converter 40 and the output protection circuit 41 for respectively controlling the power converter 40 and the output protection circuit 41. The control unit 42 includes a first control circuit 421 and a second control circuit 422, in which the first control circuit 421 is configured to control the output protection circuit 41 by a control signal Vs to turn on or off according to the operating frequency fs of the power converter 40 and the intermediate output voltage Vo1. The second control circuit 422 is configured to control the power converter 40 according to the intermediate output voltage Vo1, such that the voltage level of the intermediate output voltage Vo1 is maintained at the rated voltage level. Also, the control unit 42 may be implemented by an analog circuit, a digital circuit or a combination of an analog circuit and a digital circuit.

Referring to FIG. 3(B), the DC gain (Vo1/Vin) of the power converter 40 may change according to the ratio (fs/fo) of the operating frequency fs over the resonant frequency fo. In other words, the DC gain of the power converter 40 changes opposite to the operating frequency fs, which means that when fs rises up the DC gain decreases. Thus when the intermediate output voltage Vo1 is higher than the rated voltage level, the second control circuit 422 will increase the operating frequency fs of the power converter 40. Adversely, when the intermediate output voltage Vo1 is lower than the rated voltage level, the second control circuit 422 will decrease the operating frequency fs of the power converter 40. Hence, the second control circuit 422 can maintain the intermediate output voltage Vo1 at a rated voltage level by changing the operating frequency fs of the power converter 40.

In the embodiment, when one of the power supplies 4 is malfunctioned to cause the output voltage Vo to rise up, the intermediate output voltages Vo1 of the normally-operating power supplies rise up accordingly. Under this condition, if one of the normally-operating power supplies is a resonant converter with its normal operating range has the characteristic that the DC gain decreases with the increase of the operating frequency, then its control unit 42 will control the switching circuit (not shown) of the power converter 40 to increase its operating frequency in order to maintain the output voltage Vo and the intermediate output voltage Vo1 to the rated voltage level. When the operating frequency fs is higher than a first reference frequency fref1 and the intermediate output voltage Vo1 of the normally-operating power supply 4 is higher than a first reference voltage Vref1, the control unit 42 turns off the switch 41a. This can prohibit the power converter 40 of the normally-operating power supply 4 from being burnt down due to the increase of the operating frequency. Also, this can prohibit a reverse current from being induced in the normally-operating power supply 4.

In the embodiment, the first control circuit 421 includes a first comparing circuit 4211, a second comparing circuit 4212, an AND gate logic circuit 4213, and a driving circuit 4214, in which the first comparing circuit 4211 is connected between the output terminal of the power converter 40 and the AND gate logic circuit 4213 for determining whether the intermediate output voltage Vo1 is higher than a first reference voltage Vref1. The second comparing circuit 4212 is connected between the second control circuit 422 and the AND gate logic circuit 4213 for determining whether the operating frequency fs is higher than a first reference frequency fref1.

The AND gate logic circuit 4213 is connected to the first comparing circuit 4211, the second comparing circuit 4212, and the driving circuit 4214 for performing logic operations to the first comparing signal Vp1 outputted from the first comparing circuit 4211 and the second comparing signal Vp2 outputted from the second comparing circuit 4212. The driving circuit 4214 is connected between the control terminal of the switch 41a and the output terminal of the AND gate logic circuit 4213 for driving the switch 41a to turn on or off in response to the result of the logic operation carried out by the AND gate logic circuit 4213.

When the intermediate output voltage Vo1 is higher than the first reference voltage Vref1 and the operating frequency fs is higher than the first reference frequency fref1, the first comparing circuit 4211 and the second comparing circuit 4212 respectively generate a first comparing signal Vp1 and a second comparing signal Vp2 both having an enabling state to the AND gate logic circuit 4213. The driving circuit 4214 outputs a first control signal Vs having a disabling state by the logic operation of the AND gate logic circuit 4213 performed to the first comparing signal Vp1 and a second comparing signal Vp2, thereby turning off the switch 41a.

On the contrary, when the intermediate output voltage Vo1 is lower than the first reference voltage Vref1 or the operating frequency fs is lower than the first reference frequency fref1, the first comparing circuit 4211 or the second comparing circuit 4212 respectively generate a first comparing signal Vp1 or a second comparing signal Vp2 having a disabling state to the AND gate logic circuit 4213. The driving circuit 4214 outputs a first control signal Vs having an enabling state by the logic operation of the AND gate logic circuit 4213 performed to the first comparing signal Vp1 and a second comparing signal Vp2, thereby turning on the switch 41a.

It is to be noted that the power converter 40 and the second control circuit 422 may have various topologies; it is intended to give an example to illustrate the operating theorem of the power converter.

Figure 4:
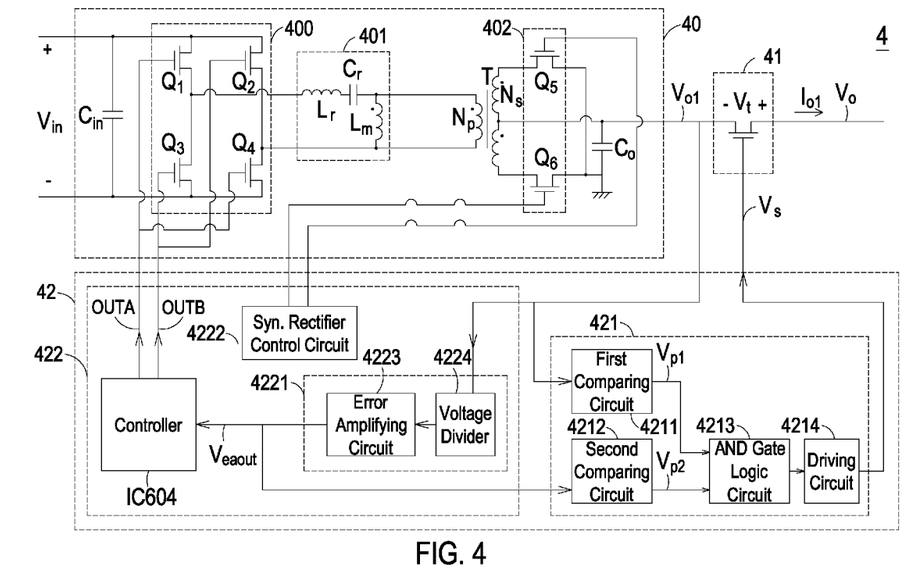
FIG. 4 is a circuit schematic diagram showing the power supply according to a preferred embodiment of the invention.

Referring to FIGS. 3(A) and 4, in which FIG. 4 is a circuit schematic diagram showing the power supply according to a preferred embodiment of the invention. As shown in FIG. 4, the power converter 40 is a LLC series resonant converter and includes an input capacitor Cin, a switch circuit 400, a resonant circuit 401, a transformer T, an output rectification circuit 402, and an output capacitor Co. The second control circuit 422 includes a feedback circuit 4221, a synchronous rectifier control circuit 4222, and a controller IC604.

In the power converter 40, the input capacitor Cin is connected to the input terminal of the switch circuit 400. The resonant circuit 401 is connected between the output terminal of the switch circuit 400 and the primary side Np of the transformer T. The output rectification circuit 402 is connected to the secondary side Ns of the transformer T. One end of the output capacitor Co is connected to the output rectification circuit 402 and the output protection circuit, and the other end of the output capacitor Co is connected to the negative voltage bus (ground terminal) of the power supply 4.

The feedback circuit 4221 is connected between the output terminal of the power converter 40 and the controller IC604 for generating an error amplifying signal Veaout to the controller IC604 according to the voltage level of the intermediate output voltage Vo1. Therefore, the controller IC604 can determine whether the voltage level of the intermediate output voltage Vo1 is maintained at its rated voltage level. In the embodiment, the error amplifying signal Veaout is a signal subjected to change according to the operating frequency fs. The feedback circuit 4221 is configured to provide the error amplifying signal Veaout varying opposite to the operating frequency fs for the second comparing circuit 4212, thereby allowing the second comparing circuit 4212 to determine whether the operating frequency fs is higher than the first reference frequency fref1 according to the error amplifying signal.

The feedback circuit 4221 includes an error amplifying circuit 4223 and a voltage divider 4224. The error amplify circuit may be a proportional-integral circuit, an integral circuit, a proportional-integral-differential circuit etc. The intermediate output voltage Vo1 is processed in turn by the voltage divider 4224 and the error amplifying circuit 4223, and thereby generates an error amplifying signal Veaout wherein the voltage level of the error amplifying signal Veaout varies with the voltage level of the intermediate output voltage Vo1.

The error amplifying signal Veaout is received by the second comparing circuit 4212 to determine whether the operating frequency fs of the converter 40 is higher than the first predetermined frequency fref1 since the variation of error amplifying signal Veaout can reflect the operating frequency fs. Under this condition, the lower the voltage level of the error amplifying signal Veaout, the higher operating frequency fs.

The controller IC604 generates a second control signal OUTA to drive the switch circuit 400 according to the error amplifying signal Veaout to maintain the intermediate output voltage Vo1 at a rated voltage level by regulating the operating frequency fs and/or the duty cycle of the switch circuit 400.

In the embodiment, the switch circuit 400 is a full-bridge circuit including four switches Q1-Q4. The switches Q1 and Q3 are connected in series to form a first switch bridge; the switches Q2 and Q4 are connected in series to form a second switch bridge; and the first and second switch bridges are connected in parallel with the input capacitor Cin. The controller IC604 is connected to the control terminals of the switches Q1-Q4, and is configured to generate a second control signal OUTA and a third control signal OUTB to the control the switches (Q1, Q3) and (Q2, Q4), respectively. In the embodiment, the controller IC604 changes the operating frequency of the second control signal OUTA and the third control signal OUTB according to the feedback signal Veaout, thereby maintaining the voltage level of the output voltage Vo1 at a rated voltage level. In operation, the operating frequency of the second control signal OUTA and the third control signal OUTB is regulated to vary in opposition to the change of the error amplifying signal Veaout to maintain the rated output voltage level.

The resonant circuit 401 may be a series resonant circuit, a parallel resonant circuit or a series-parallel resonant circuit etc. In the embodiment, the resonant circuit 401 is a LLC series resonant circuit and includes a first resonant inductor Lr, a resonant capacitor Cr, and a second resonant inductor Lm. The first resonant inductor Lr, the resonant capacitor Cr, and the second resonant inductor Lm are connected in series with each other across the output terminals of the switch circuit 400. The second control circuit 422 controls the switch circuit 400 to selectively transfer the energy from the input voltage Vin to the resonant circuit 401 through the switch circuit 400. The amount of the energy transferred to the primary side Np of the transformer T is determined by the resonance of the resonant circuit 401, thereby converting the input voltage Vin into the intermediate output voltage Vo1.

In the embodiment, the output rectification circuit 402 may be a synchronous rectification circuit and includes a fifth switch Q5 and a sixth switch Q6. The fifth switch Q5 is connected between one end of the secondary side Ns of the transformer T and the negative voltage bus of the power supply 4, and the sixth switch Q6 is connected between the other end of the secondary side Ns of the transformer T and the negative voltage bus of the power supply 4. The synchronous rectifier control circuit 4222 outputs signals to control the fifth switch Q5 and the sixth switch Q6.

Figure 5:
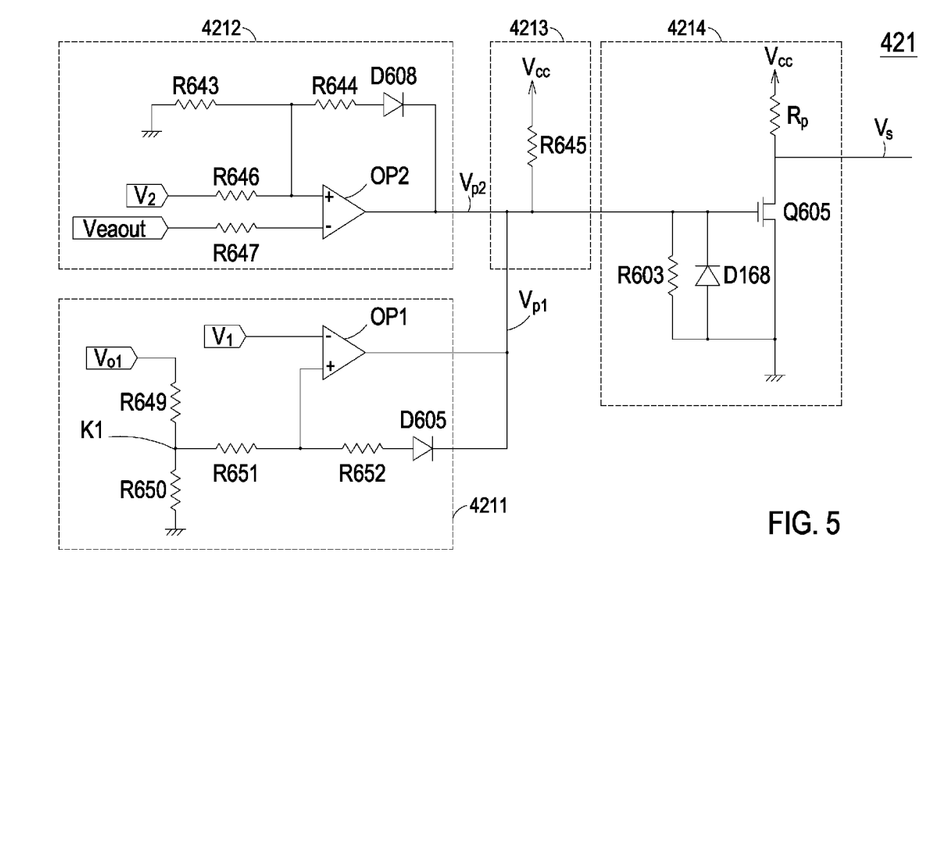
FIG. 5 is a circuit schematic diagram showing the first control circuit according to a preferred embodiment of the invention.

Referring to FIGS. 3(A), 4 and 5, in which FIG. 5 is a circuit schematic diagram showing the first control circuit according to a preferred embodiment of the invention. As shown in FIG. 5, the first comparing circuit 4211 includes a first resistor R649, a second resistor R650, a third resistor R651, a fourth resistor R652, a first diode D605, and a first operational amplifier OP1, in which the first resistor R649 is connected to the output terminal of the power converter 40 and is connected in series with the second resistor R650. The third resistor R651 is connected between a junction node K1 located between the first resistor R649 and the second resistor R650 and a positive input terminal of the first operational amplifier OP1. The fourth resistor R652 and the first diode D605 are connected in series between a positive input terminal and an output terminal of the first operational amplifier OP1. The negative input terminal of the first operational amplifier OP1 is configured to receive a first voltage V1 having a voltage level of, for example, 2.5V as a reference voltage.

In the embodiment, the second comparing circuit 4212 includes a fifth resistor R643, a sixth resistor R644, a seventh resistor R646, an eighth resistor R647, a second diode D608, and a second operational amplifier OP2, in which one end of the fifth resistor R643 and one end of the seventh resistor R644 are connected to a positive input terminal of the second operational amplifier OP2, and the other end of the fifth resistor R643 is connected to the negative voltage bus (ground terminal) of the power supply 4. A second voltage V2 which has a voltage level of 2.5V, for example, is applied to the other end of the seventh resistor R646. The sixth resistor R644 and the second diode D608 are connected in series with each other between the positive input terminal and an output terminal of the second operational amplifier OP2. One end of the eighth resistor R647 is connected to a negative input terminal of the second operational amplifier OP2, and the other end of the eighth resistor R647 is connected to a second control circuit (not shown), while the error amplifying signal Veaout is applied to the other end of the eighth resistor R647.

In the embodiment, the output terminal of the first operational amplifier OP1 of the first comparing circuit 4211 and the output terminal of the second operational amplifier OP2 of the second comparing circuit 4212 are of open-drain type or open collector type. The function of AND gate logic circuit 4213 are implemented by connecting the output of the first operational amplifier OP1 of the first comparing circuit 4211 and the output of the second operational amplifier OP2 to one terminal of a ninth resistor R645, whose other terminal is configured to receive a supply voltage e.g. an auxiliary voltage source Vcc having a level of, for example, 5V.

In the embodiment, the driving circuit 4214 includes a driving switch Q605, a tenth resistor R603, an eleventh resistor Rp, and a third diode D168, in which the driving switch Q605 is connected between the control terminal of the output protection circuit 41 and the negative voltage bus (ground terminal) of the power supply 4. One end of the tenth resistor R603 and one end of the third diode D168 are connected to the control terminal of the driving switch Q605. The other end of the tenth resistor R603 and the other end of the third diode D168 is connected to the negative voltage bus (ground terminal) of the power supply 4. One end of the eleventh resistor Rp is connected to the switch Q605, and the other end of the eleventh resistor Rp is configured to receive the auxiliary voltage Vcc.

In the embodiment, when the intermediate output voltage Vo1 is higher than the first reference voltage and the operating frequency fs is higher than the first reference frequency fref1, the first operational amplifier OP1 of the first comparing circuit 4211 and the second operational amplifier OP2 of the second comparing circuit 4212 will generate a first comparing signal Vp1 and a second comparing signal Vp2 both having an enabling state with a high voltage level to the AND gate logic circuit 4213. The AND gate logic circuit 4213 performs logic operation to the first comparing signal Vp1 and a second comparing signal Vp2, and thereby turning on the switch Q605 of the driving circuit 4214 to output a first control signal Vs having a disabling state with a low voltage level, so as to turn off the switch 41a.

In the embodiment, the first comparing circuit 4211 and the second comparing circuit 4212 both have hysteretic characteristics. Please refer to FIG. 6. When the intermediate output voltage Vo1 is lower than the first reference voltage Vref1, i.e. the voltage at the node K1 is lower than the reference voltage V1 and Vref1 is equal to V1×(1+R649/R650), the first operational amplifier OP1 of the first comparing circuit 4211 outputs a first comparing signal Vp1 having a disabling state with a low voltage level to the AND gate logic circuit 4213. The AND gate logic circuit 4213 performs logic operation and outputs a signal with low voltage level to turn off the driving switch Q605 of the driving circuit 4214 accordingly so as to turn on the switch element 41a. Also, when the intermediate output voltage Vo1 increases to be higher than the second reference voltage Vref2, that is to say, the voltage at the positive terminal of OP1 is higher than V1 and Vref2 is equal to V1×(1+(R651+R649)/R652+R649*((R651+R652)/R650/R652)), the first comparator OP1 outputs a first comparing signal Vp1 having an enabling state with a high voltage level.

Likewise, when the operating frequency fs is lower than the first reference frequency fref1, the error amplifying signal Veaout is higher than the first error amplifying reference signal V2×R643/(R643+R646) correspondingly. The second operational amplifier OP2 of the second comparing circuit 4212 generates a second comparing signal Vp2 having a disabling state with a low voltage level to the AND gate logic circuit 4213. The AND gate logic circuit 4213 performs logic operation and outputs a signal with a low voltage level to turn off the driving switch Q605 so as to turn on the switch 41a. Under this condition, the voltage at the positive terminal of OP2 is substantially equal to V2×(R643//R644)/(R646+R643//R644). When the operating frequency fs increases to be higher than a second reference frequency, the error amplifying signal is lower than a second error amplifying reference signal V2×(R643//R644)/(R646+R643//R644). And then the second comparator OP2 outputs a second comparing signal Vp2 having an enabling state.

In the aforesaid embodiment, the switches may be implemented by MOSFETs, BJTs, SCRs, IGBTs, or TRIACs. Also, the first reference voltage Vref1 and the second reference voltage Vref2 can be changed by changing the voltage level of the first voltage V1. Likewise, the first reference frequency fref1 and the second reference frequency fref2 can be changed by changing the voltage level of the second voltage V2.

In the aforesaid embodiment, the first control circuit 421 and the second control circuit 422 in the control unit 42 are both analog circuits. However, the first control circuit 421 may be a digital circuit (e.g. DSP, Digital Signal Processor) for converting the received analog signals into digital signals and accomplishing comparison operation and logic AND operation by computerized instructions. Likewise, the second control circuit 422 may have a digital error amplifier for converting the received analog signals into digital signals and accomplishing comparison operation and logic AND operation by computerized instructions. The first control circuit 421 and the second control circuit 422 may be integrated into a single digital signal processor.

Figure 6:
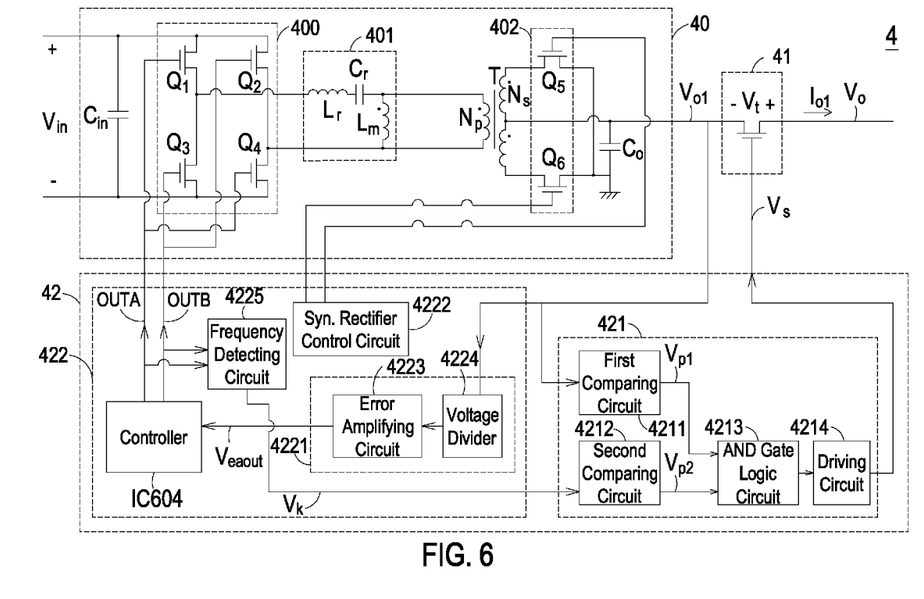
FIG. 6 is a circuit schematic diagram showing the power supply according to another preferred embodiment of the invention.
Figure 7:
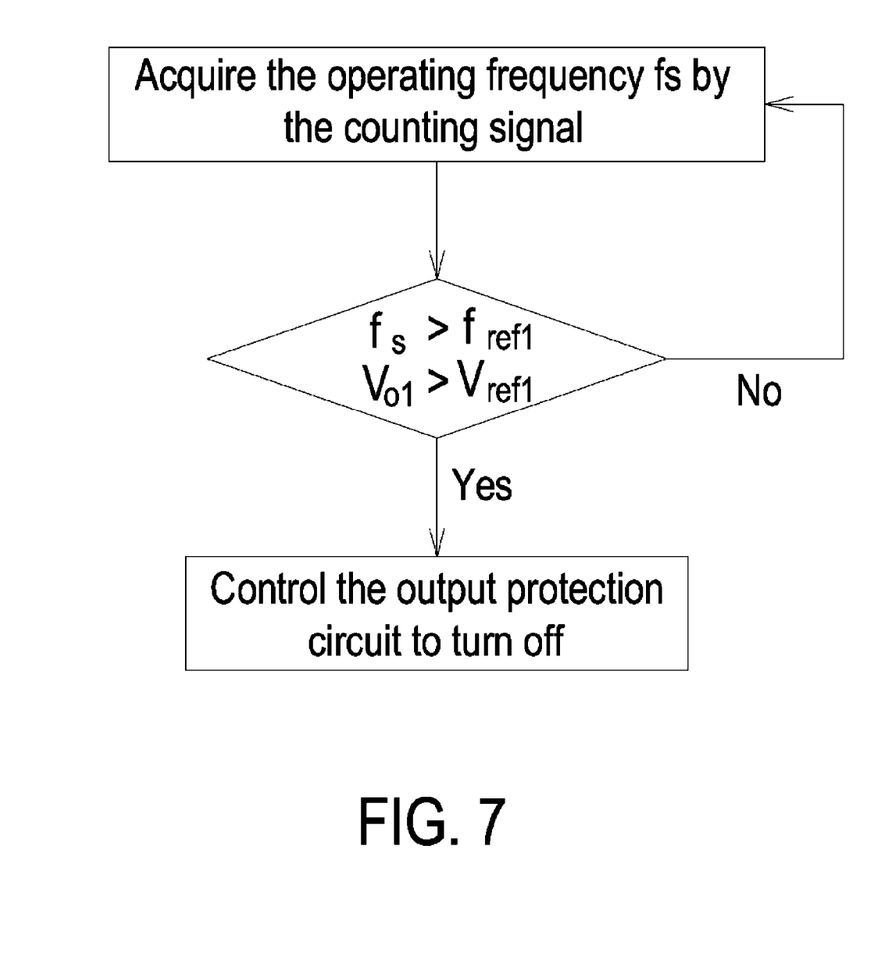
FIG. 7 shows the control method applied to the power supply according to a preferred embodiment of the invention.

Referring to FIGS. 4, 6 and 7, in which FIG. 6 is a circuit schematic diagram showing the power supply according to another preferred embodiment of the invention, and FIG. 7 shows the control method applied to the power supply according to a preferred embodiment of the invention. The embodiment of FIG. 6 is different from the previous embodiment in terms of a frequency detecting circuit 4225 in the second control circuit 422 shown in FIG. 6. The frequency detecting circuit 4225 may be a counter connected to the controller IC604 and the second comparing circuit 4212. The frequency detecting circuit 4225 is configured to calculate the number of pulses of the second control signal OUTA or the third control signal OUTB in a predetermined time period, thereby obtaining a counting signal Vk associated with the operating frequency fs of the power converter 40. The second comparing circuit 4212 may determine whether the operating frequency fs is higher than the first reference frequency fref1 by the counting signal Vk. In the embodiment, the frequency detecting circuit 4225 can further detect any signal that is associated with the operating frequency to generate a signal being varied with the operating frequency fs. For example, the current of the switches Q1-Q4 or the voltage at a node in the switches Q1-Q4 can be taken as the input of the frequency detecting circuit 4225, thereby obtaining a frequency signal such as the counting signal Vk being varied with the operating frequency fs of the power converter 40.

In the embodiment, the first control circuit 421 may be a digital circuit for converting the received analog signals into digital signals and accomplishing comparison operation and logic AND operation by computerized instructions. Likewise, the second control circuit 422 may be a digital circuit e.g. digital signal processor for converting the received analog signals into digital signals and accomplishing comparison operation and logic AND operation by computerized instructions. The first control circuit 421 and the second control circuit 422 may be integrated into a single digital signal processor. In the embodiment, the counting signal Vk can be converted into a voltage signal and compared by the second comparator 4212. And the first and second control circuits 421, 422 may also be mixed-digital-analog circuits.

The detailed procedure of the control method applied to the power supply of the invention includes the following steps:

(a) Providing a power converter 40 for converting an input voltage into an intermediate output voltage Vo1;

(b) Providing an output protection circuit 41 connected between the output terminal of the power converter 40 and the output terminal of the power supply 4 for protecting the power supply by its on/off operations;

(c) detecting the intermediate output voltage Vo1;

(d) detecting the operating frequency fs of the power converter 40;

(e) comparing the intermediate output voltage Vo1 with a first reference voltage Vref1;

(f) comparing the operating frequency fs of the power converter 40 with a first reference frequency fref1; and (g) when the intermediate output voltage Vo1 is higher than the first reference voltage Vref1 and the operating frequency fs is higher than the first reference frequency fref1, the control circuit 42 turns off the output protection circuit 41.

In conclusion, the inventive power supply and the control method for the inventive power supply and the inventive power supply system is featured by that in case of a malfunctioned power supply, the output protection circuit of the normally-operating power supply is turned off when the intermediate output voltage and the operating frequency of normally-operating power supplies is excessively high, thereby prohibiting a reverse current from being induced or prohibiting the normally-operating power supplies from being burnt down due to the excessively high operating frequency. Also, the switch element of the output protection circuit has low conducting impedance and low forward voltage drop. In this way, the power loss of the inventive power supply and the inventive power supply system can be reduced. Further, the operating temperature is lowered and the power efficiency is enhanced.

While the invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the invention which is defined by the appended claims.

What is claimed is:

1. A power supply for receiving an input voltage and generating an output voltage, comprising:
    a power converter for converting an input voltage into an intermediate output voltage;
    an output protection circuit connected between an output terminal of the power converter and an output terminal of the power supply for protecting the power supply by its ON/OFF operations; and
    a control unit connected to the power converter for detecting an operating frequency and the intermediate output voltage and the output protection circuit for controlling the output protection circuit;
    wherein when the operating frequency of the power converter is higher than a first reference frequency and the intermediate output voltage is higher than a first reference voltage, the control unit generates a first control signal to a control terminal of the output protection circuit to turn off the output protection circuit.

2. The power supply according to claim 1 wherein the control unit comprises a first control circuit including:
    a first comparing circuit connected to the output terminal of the power converter for determining whether the intermediate output voltage is higher than the first reference voltage;
    a second comparing circuit connected to the power converter for determining whether the operating frequency of the power converter is higher than the first reference frequency by a signal being varied with the operating frequency; and
    an AND gate logic circuit connected to an output terminal of the first comparing circuit and an output terminal of the second comparing circuit for performing logic operations to a first comparing signal outputted from the first comparing circuit and a second comparing signal outputted from the second comparing circuit, thereby turning on or off the output protection circuit according to a result of the logic operations.

3. The power supply according to claim 2 wherein when the intermediate output voltage is higher than the reference voltage and the operating frequency of the power converter is higher than the first reference frequency, the first comparing circuit and the second comparing circuit respectively output a first control signal and a second control signal both having an enabling state to the AND gate logic circuit, thereby controlling the driving circuit to output the first control signal having a disabling state to turn off the output protection circuit according to a result of the logic operations of the AND gate logic circuit.

4. The power supply according to claim 2 wherein the control unit further includes a second control circuit connected to the power converter for controlling the power converter to convert the input voltage into the intermediate output voltage and generating the signal being varied with the operating frequency to the second comparing circuit.

5. The power supply according to claim 4 wherein the second control circuit includes a feedback circuit for providing the signal being varied with the operating frequency.

6. The power supply according to claim 5 wherein the feedback circuit includes:
    an error amplifying circuit for converting the intermediate output voltage into the error amplifying signal and providing the error amplifying signal to the first control circuit, and wherein the signal being varied with the operating frequency is the error amplifying signal and the first control circuit is configured to determine whether the operating frequency is higher than the first reference frequency according to the error amplifying signal.

7. The power supply according to claim 6 wherein the error amplifying signal varies opposite to the operating frequency.

8. The power supply according to claim 7 wherein the second comparing circuit is configured to compare the error amplifying signal with a first error amplifying reference signal being corresponding to the first reference frequency to determine whether the operating frequency is higher than the first reference frequency.

9. The power supply according to claim 5 wherein the second control circuit further includes a frequency detecting circuit for detecting the operating frequency of the power converter and outputting a counting signal being varied with the operating frequency to the first control circuit, and wherein the signal being varied with the operating frequency is the counting signal, and thereby allowing the first control circuit to determine whether the operating frequency is higher than the first reference frequency according to the counting signal.

10. The power supply according to claim 9 wherein the frequency detecting circuit is a counter for counting the number of pulses of the second control signal in a predetermined time period, thereby outputting the counting signal indicative of the operating frequency of the power converter.

11. The power supply according to claim 2 wherein the power converter comprises a switch circuit, a resonant circuit, and a transformer, and wherein the resonant circuit is connected between input terminals of the power converter and a primary side of the transformer, and wherein a secondary side of the transformer is connected to the output protection circuit.

12. The power supply according to claim 2 wherein the power converter is a series resonant converter or a parallel resonant converter.

13. A power supply system for receiving an input voltage and generating an output voltage and a systematic output current, comprising:
    a plurality of power supplies connected in parallel with each other, wherein at least one of the power supplies comprises:
        a power converter for converting the input voltage into an intermediate output voltage;

an output protection circuit connected between an output terminal of the power converter and an output terminal of the power supply for protecting the power supply by its ON/OFF operations; and a control unit connected to the power converter for detecting an operating frequency and the intermediate output voltage and the output protection circuit for controlling the output protection circuit;

wherein when the operating frequency of the power converter is higher than a first reference frequency and the intermediate output voltage is higher than a first reference voltage, the control unit outputs a first control signal to a control terminal of the output protection circuit to turn off the output protection circuit.

14. The power supply system according to claim 13 wherein the control unit comprises a first control circuit including:

a first comparing circuit connected to the output terminal of the power converter for determining whether the intermediate output voltage is higher than the first reference voltage;

a second comparing circuit connected to the power converter for determining whether the operating frequency of the power converter is higher than the first reference frequency by a signal being varied with the operating frequency; and an AND gate logic circuit connected to an output terminal of the first comparing circuit and an output terminal of the second comparing circuit for performing logic operations to a first comparing signal outputted from the first comparing circuit and a second comparing signal outputted from the second comparing circuit, thereby turning on or off the output protection circuit according to a result of the logic operations of the AND gate logic circuit.

15. The power supply system according to claim 14 wherein the control unit further unit further comprises a second control circuit connected to the power converter for controlling the power converter to convert the input voltage into the intermediate output voltage, and wherein the second control circuit includes a feedback circuit connected to the output terminal of the power converter for providing a signal being varied with the operating frequency to the first control circuit, and wherein the signal is an error amplifying signal and the first control circuit is configured to determine whether the operating frequency is higher than the first reference frequency according to the error amplifying signal.

16. A control method for controlling a power supply, comprising the steps of:

providing a power converter for converting an input voltage into an intermediate output voltage;

providing an output protection circuit connected between an output terminal of the power converter and an output terminal of the power supply for protecting the power supply by its ON/OFF operations;

detecting the intermediate output voltage;

detecting an operating frequency of the power converter;

comparing the intermediate output voltage with a first reference voltage;

comparing the operating frequency with a first reference frequency; and when the operating frequency of the power converter is higher than the first reference frequency and the intermediate output voltage is higher than the reference voltage, turning off the output protection circuit.

17. The control method according to claim 16 wherein the step of detecting an operating frequency of the power converter is accomplished by detecting a signal indicative of the operating frequency and outputting a signal being varied with the operating frequency.

18. The control method according to claim 17 wherein the signal indicative of the operating frequency is the intermediate output voltage.

19. The control method according to claim 18 wherein the signal being varied with the operating frequency is an error amplifying signal generated by comparing the intermediate output voltage in an error amplifying process.

20. The control method according to claim 17 wherein the signal indicative of the operating frequency is the operating frequency of the power converter.

21. The control method according to claim 20 wherein the signal being varied with the operating frequency is a counting signal generated by counting the pulse of the operating frequency in a period.

* * * * *